F. W. WALLACE.
MACHINE FOR CUTTING GRASS FROM RAILROAD TRACKS.
APPLICATION FILED JULY 25, 1912.
1,051,933.
Patented Feb. 4, 1913.
3 SHEETS—SHEET 1.
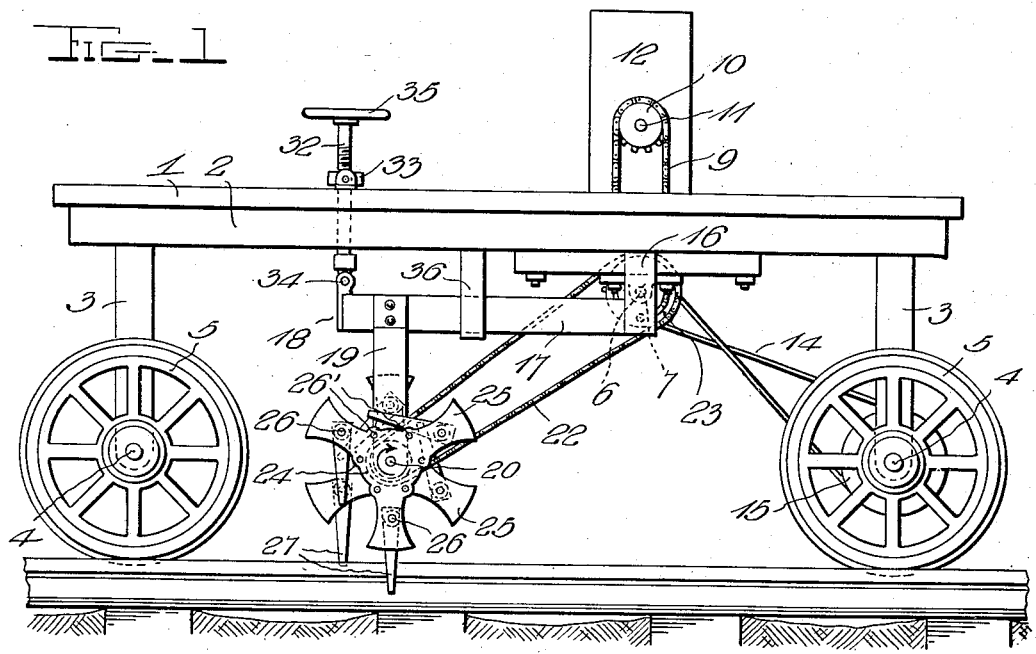
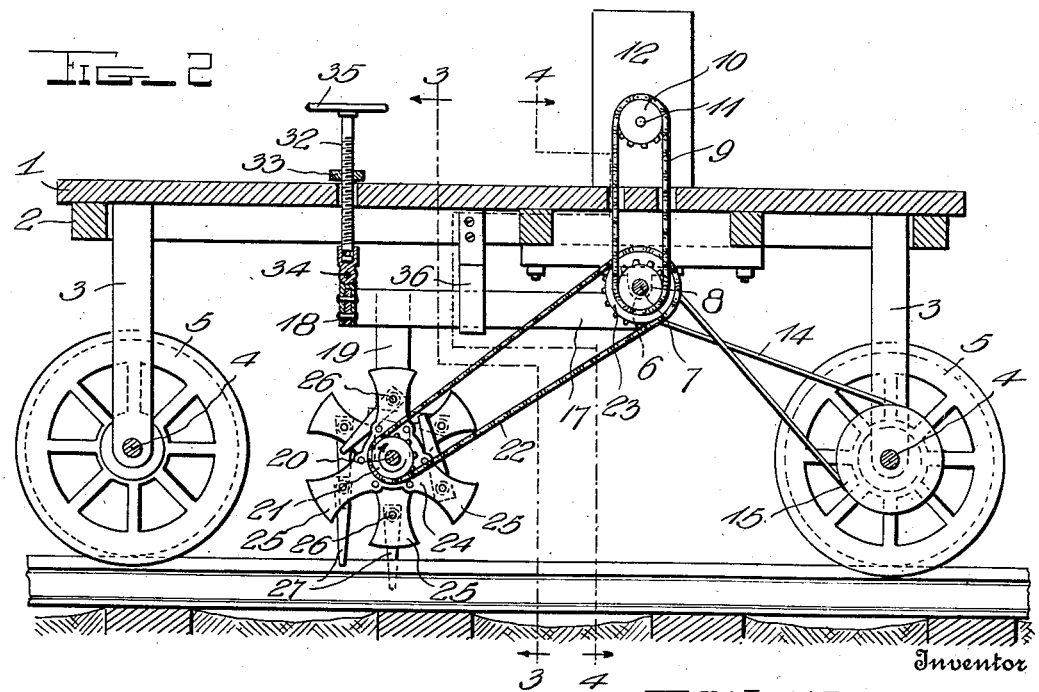
Witnesses
Inventor
F. W. Wallace F. W. WALLACE.
MACHINE FOR CUTTING GRASS FROM RAILROAD TRACKS.
APPLICATION FILED JULY 25, 1912.
1,051,933.
Patented Feb. 4, 1913.
3 SHEETS—SHEET 2.
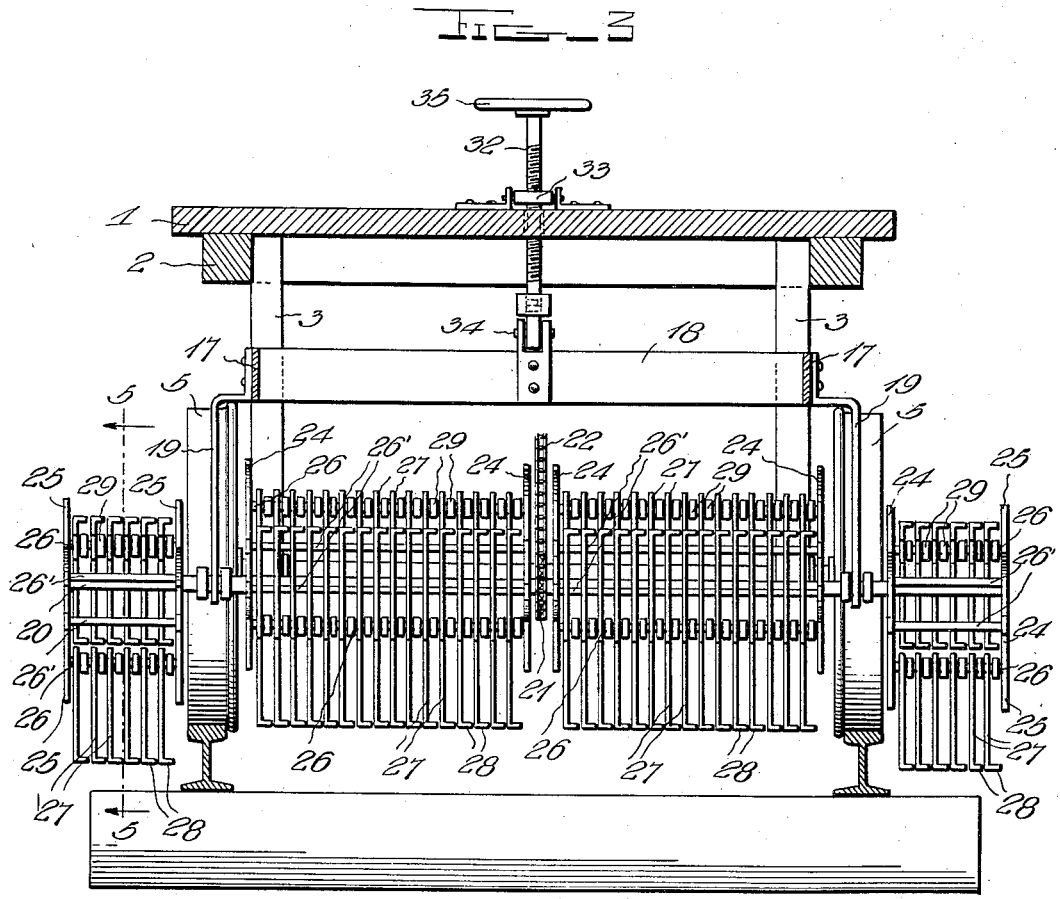
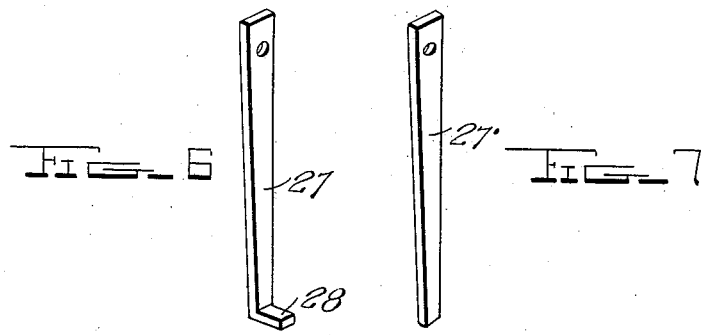

F. W. WALLACE.
MACHINE FOR CUTTING GRASS FROM RAILROAD TRACKS.
APPLICATION FILED JULY 25, 1912.
1,051,933.
Patented Feb. 4, 1913.
3 SHEETS—SHEET 3.
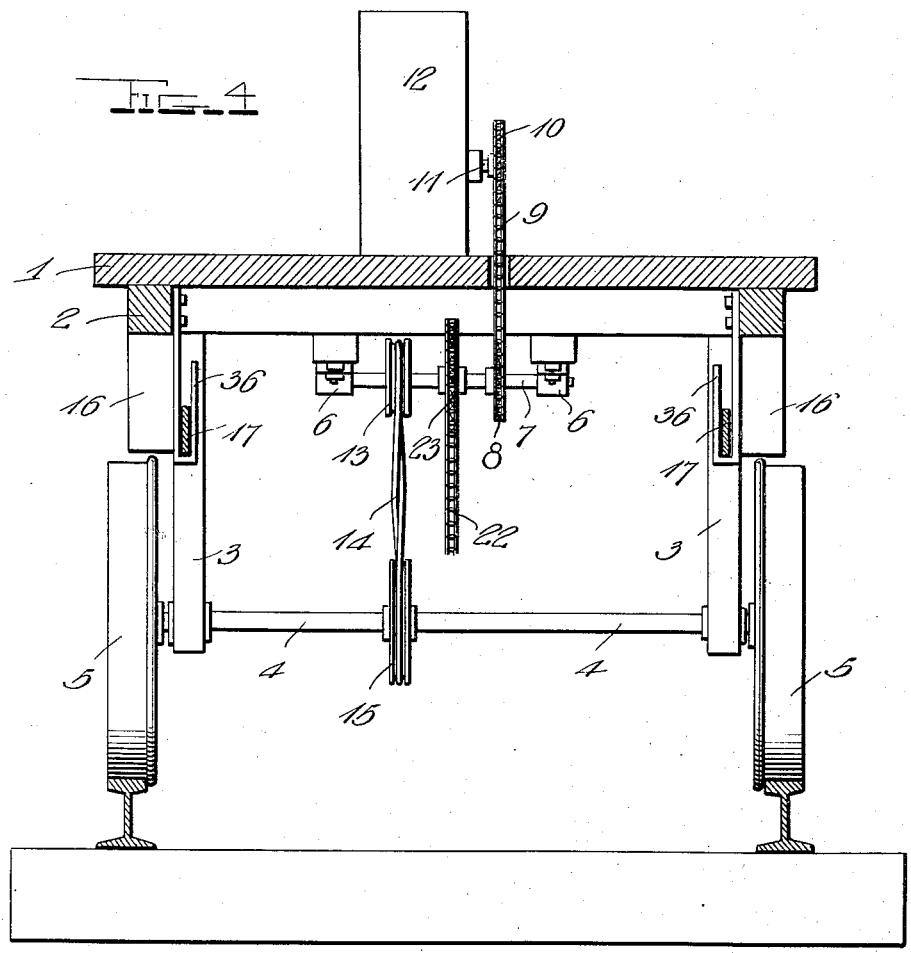
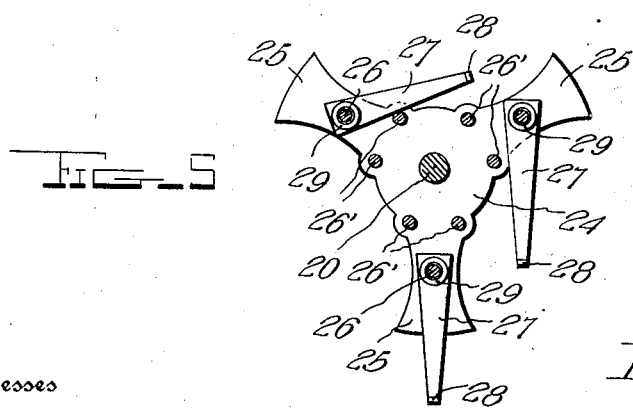
Witnesses
Inventor
F. W. Wallace
By
Attorneys

UNITED STATES PATENT OFFICE.

FRANK W. WALLACE, OF CHATTANOOGA, TENNESSEE.

MACHINE FOR CUTTING GRASS FROM RAILROAD-TRACKS.

1,051,933.      Specification of Letters Patent.      Patented Feb. 4, 1913.

Application filed July 25, 1912. Serial No. 711,600.

*To all whom it may concern:*

Be it known that I, FRANK W. WALLACE, a citizen of the United States, residing at Chattanooga, in the county of Hamilton and State of Tennessee, have invented certain new and useful Improvements in Machines for Cutting Grass from Railroad-Tracks; and I do declare the following to be a full, clear, and exact description of the invention, such as will enable others skilled in the art to which it appertains to make and use the same.

This invention relates to improvements in grass and weed cutting machines and particularly to machines for cutting grass and weeds from railway tracks.

One object of the invention is to provide a machine of this character having an improved construction and arrangement of cutting blades and means for supporting and yieldingly holding the same in position for cutting the weeds and grass from the tracks.

Another object is to provide a machine of this character which will be simple, strong and durable in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings; Figure 1 is a side elevation of my improved grass and weed cutting machine; Fig. 2 is a vertical longitudinal section thereof; Fig. 3, is a vertical cross section of the same taken on line 3—3 of Fig. 2; Fig. 4, a similar view taken on line 4—4 of Fig. 2; Fig. 5 is an enlarged detail section on line 5—5 of Fig. 3. Fig. 6 is a detail perspective view of one of the cutting blades of the machine. Fig. 7 is a similar view of a modified form of cutting blades.

In the embodiment of the invention as shown in the accompanying drawing, I provide a platform 1 having a suitable supporting frame 2 to which are secured the bearing standards 3 in which the axles 4 of the supporting wheels 5 are fixed. These parts may be of any suitable construction and design.

Secured to and depending from two of the longitudinal bars of the platform supporting frame 2 at a suitable distance in advance of the bearing standards for the rear axle of the machine are bearing brackets 6 in which is revolubly mounted the power transmitting shaft 7 of the machine, said shaft having fixed thereon a sprocket gear 8 which is connected by a sprocket chain 9 to a sprocket gear 10 on the shaft 11 of a suitable motor 12 arranged on the platform 1 of the machine. Also fixed on the shaft 7 is a driving pulley 13 which is connected by a crossing belt 14 with a pulley 15 fixed on the rear axle 4 of the machine whereby the latter and the wheels 5 fixed thereon are driven to propel the machine.

Secured to and depending from the side bars of the supporting frame 2 and preferably in line with the brackets 6 are frame supporting brackets 16 to which are pivotally connected the inner ends of the side bars 17 of a frame 18 which carries and adjustably supports the cutting mechanism of the machine. Secured to the forward end of the frame 18 are hangers 19 in the lower ends of which is revolubly mounted a blade supporting and operating shaft 20. The shaft 20 is of sufficient length to extend entirely across the width of the machine and a suitable distance beyond the outer sides of the track rails as clearly shown in Fig. 3 of the drawings. On the shaft 20 midway between its ends is fixedly mounted a sprocket gear pinion 21 which is connected by a driving chain 22 to a sprocket gear 23 fixed on the power transmitting shaft 7 whereby the shaft 20 is revolved in the proper direction for operating the cutting mechanism.

Fixedly mounted on the shaft 20 are a series of blade supporting plates 24 having radially projecting arms 25, three of which are shown in the present instance. The plates 24 are arranged in pairs on the shaft 20, one pair of the plates being arranged on the projecting or laterally extending ends of the shaft, while the other pairs are arranged between the sprocket gear 21 on the center of the shaft and points near the inner sides of the hangers 19. The outer and inner parts of plates are connected by blade operating rods 26 to which are pivotally connected the inner ends of series of radially projecting cutting blades 27, said blades being preferably in the form of narrow plates tapered from their inner toward their outer ends and having on their outer ends right angular lugs 28. The blades 27 are spaced apart on the rods 26 by spacing collars 29, arranged as shown. Also secured to the arms of the pairs of blade supporting plates are blade supporting rods 29 on which the blades drop and are supported when carried around by the plates 24 and rods 26. By thus supporting the blades it will be seen that they will be forcibly swung around to operative positions for engaging and cutting the grass and weeds through the center and along the outer sides of the road bed when the cutting mechanism is revolved in the manner described and that when any of the blades come into engagement with an obstruction said blades will readily swing or give back thereby permitting the blades to pass over the obstruction without being broken or injured.

In Fig. 6 of the drawings is shown a modified form of cutting blades 27' which in some instances may be advantageously employed instead of the blades shown in the previous figures of the drawing.

In order to permit the cutting mechanism to be raised or lifted to clear fixed obstructions such as cattle guards, switch rails and the like, I provide an elevating mechanism which is here shown and preferably comprises a coarsely threaded screw 32 which is engaged with a nut 33 suitably mounted in the platform of the machine. The lower end of the shaft 32 is preferably connected as at 34 to the front end of the supporting frame 17 of the cutting mechanism and on the upper end of the screw 32 is arranged a hand wheel or other suitable operating device 35. The frame 17 is supported in an operative position and the outward movement thereof limited by means of frame supporting stirrups or hangers 36 secured to the side bars of the platform supporting frame 2, said hanger or stirrups also serving as means to guide and hold the frame 17 against lateral movement.

By constructing and arranging a cutting machine as herein shown and described it will be seen that when the same is propelled over the tracks of a railway, all vegetation growing between and along the outer sides of the tracks will be cut.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as shown.

Having thus described my invention, what I claim is;

1. In a grass and weed cutting machine of the character described a movable supporting frame forming a part thereof, a cutting mechanism comprising a revolubly mounted blade operating shaft, blade supporting plates fixed thereon, blade holding rods secured to said plates, series of cutting blades carried by said rods and blade supporting rods also connected with said plates, and means for adjusting the movable supporting frame, whereby the cutting mechanism is properly adjusted.

2. In a grass and weed cutting machine of the character described, a cutting mechanism comprising a pivotally supported frame, hangers secured thereto, a blade operating shaft revolubly mounted in said hangers and geared to a moving part of the machine, a series of blade supporting plates fixed to said shaft, blade holding rods connected with said plates, series of cutting blades carried by and spaced suitable distances apart on said blade holding rods, a frame adjusting screw operatively mounted and connected to the frame of the cutting mechanism whereby the latter may be raised and lowered and held in adjusted position.

3. In a grass and weed cutting machine of the character described, a main wheeled supporting frame, a driving mechanism arranged thereon whereby the machine is propelled, a cutting mechanism, a supporting frame pivotally connected to said main supporting frame and adapted to support said cutting mechanism in operative position, said cutting mechanism comprising an operating shaft geared to said driving mechanism, series of blade supporting plates fixed on said shaft, blade holding rods arranged between and connected with said plates, a series of cutting blades pivotally secured to said rods and blade supporting rods also secured between said plates.

4. In a grass and weed cutting machine of the character described, a platform supporting frame, supporting and driving wheels operatively mounted thereon, a motor carried by said frame, a revolubly mounted power transmitting shaft driven by said motor and geared to said driving wheels whereby the machine is propelled, a cutting mechanism comprising a pivoted supporting frame, stirrups to support and hold said frame in position, hangers carried by said frame, a blade supporting and operating shaft revolubly mounted in said hangers and geared to said power transmitting shaft, blade supporting plates fixed on said shaft, radial arms on said plates, blade supporting shafts secured to said plates, series of cutting blades carried by said rods, said blades being tapered toward their outer ends, right angular lugs on said ends, and means to raise and lower said cutting mechanism to inoperative and operative positions.

In testimony whereof I have hereunto set my hand in presence of two subscribing witnesses.

FRANK W. WALLACE.

Witnesses:
　SAML. B. SMITH,
　W. D. CONNELL.